Patented Mar. 4, 1941

2,233,569

UNITED STATES PATENT OFFICE 2,233,569

P-ACYLAMINO BENZENE SULPHONYL GUANIDINES AND PROCESS FOR MAKING THEM

Philip Stanley Winnek, Riverside, Conn., assignor to American Cyanamid Company, New York, N. Y., a corporation of Maine No Drawing. Application September 19, 1940, Serial No. 357,500

5 Claims. (Cl. 260—556)

The present invention relates to a class of chemical compounds, namely the guanidine derivatives of p-acyl aminobenzene sulphonyl halides; more particularly it relates to the class of compounds represented by the following general formula:

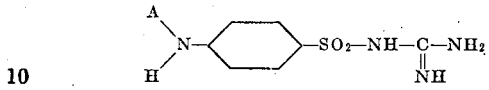

in which A represents an acyl group.

This application is in part a continuation of my application Serial No. 320,430, filed February 23, 1940 which matured into U. S. Patent 2,218,-490 on October 15, 1940. The compounds of this invention are useful as intermediates in the preparation of other compounds and particularly as an intermediate in the preparation of p-aminobenzene sulphonyl guanidine.

In general the compounds of the present invention may be prepared by reacting p-acyl aminobenzene sulphonyl halide with guanidine. In the reaction between guanidine and the sulphonyl halide a hydrogen halide is liberated, and it is therefore desirable where a good yield is to be obtained to provide a basic substance which will unite with the hydrogen halide evolved. This may be effected by carrying out the reaction in a suitable medium and adding an excess of sodium hydroxide or other alkali. Preferably, the reaction is carried out in the presence of an organic liquid such as isopropanol, acetone, or the like.

The present invention will be described in greater detail in conjunction with the following specific examples which are merely illustrative of the preferred methods of preparing representative compounds of the class and are not intended to limit the scope of the invention. Parts are by weight except in the case of liquids which are expressed in corresponding parts by volume.

Example 1

To 25 parts of guanidine nitrate suspended in a mixture of 38 parts of water and 212 parts of isopropanol was added 20 parts of sodium hydroxide. After stirring for one-half hour, the reaction mixture was cooled to 15° C. and 50 parts of p-acetyl aminobenzene sulphonyl chloride added at such a rate that the temperature did not exceed 20° C. The reaction mixture was then agitated for a period of one hour and the p-acetyl aminobenzene sulphonyl guanidine which had separated was removed by filtration and washed well with water. The product as obtained in this way was sufficiently pure for hydrolysis to p-aminobenzene sulphonyl guanidine.

Example 2

To 25 parts of guanidine nitrate suspended in a mixture of 63 parts of water and 187 parts of acetone was added 20 parts of sodium hydroxide. After stirring for one-half hour, the reaction mixture was cooled to 15° C. and 50 parts of p-acetyl aminobenzene sulphonyl chloride added at such a rate that the temperature did not exceed 20° C. The resulting suspension was diluted with 800 parts of water and allowed to stand for an additional hour. The product, p-acetyl aminobenzene sulphonyl guanidine, was removed by filtration and washed well with water.

In the above examples p-acetyl aminobenzene sulphonyl chloride was used in carrying out the reaction. The acetyl compound is preferred because of its cheapness and availability; however, it is to be understood that other acyl compounds may be used including those such as the propionyl, butyryl, benzoyl, and the like. Similarly instead of p-acetyl aminobenzene sulphonyl chloride, the corresponding p-acetyl aminobenzene sulphonyl bromide may be used.

The p-acetyl aminobenzene sulphonyl guanidine produced in the above examples may be hydrolyzed to produce p-aminobenzene sulphonyl guanidine. The hydrolysis may be carried out by suspending about 10 parts of the p-acetyl aminobenzene sulphonyl guanidine in about 40 parts of aqueous hydrochloric acid (1:3) and then heating the suspension to boiling for about 10 minutes. The solution is then allowed to cool and neutralized with sodium hydroxide. After standing for about 1 hour the p-aminobenzene sulphonyl guanidine is precipitated and can be recovered by filtration. For purification the product is crystallized from water to which has been added a small amount of activated charcoal.

What I claim is:

1. Compounds having the following general formula:

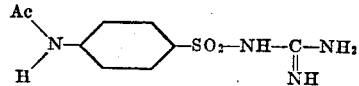

where Ac is a member of the group consisting of acyl radicals of lower saturated aliphatic monobasic acids and the acyl radical of benzoic acid.

2. The compound having the following general formula:

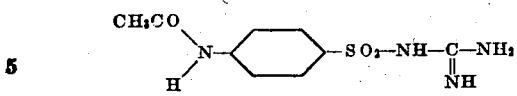

3. The process of producing the compounds of the formula:

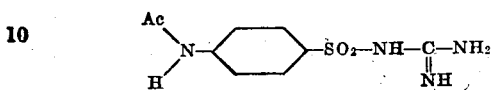

in which Ac is a member of the group consisting of acyl radicals of lower saturated aliphatic mono-basic acids and the acyl radical of benzoic acid which comprises reacting guanidine with the corresponding p-acyl aminobenzene sulphonyl chloride and separating the resulting product.

4. The process of producing p-acetyl aminobenezne sulphonyl guanidine which comprises reacting guanidine with p-acetyl aminobenzene sulphonyl chloride.

5. The process of producing p-acetyl aminobenzene sulphonyl guanidine which comprises reacting guanidine with p-acetyl aminobenzene sulphonyl chloride in the presence of isopropanol.

PHILIP STANLEY WINNEK.